No. 848,885. PATENTED APR. 2, 1907.
D. R. C. DEVINE.
AUTOMOBILE WHEEL.
APPLICATION FILED JULY 20, 1906.

WITNESSES:
Rob P Ritchie
M. M. Hamilton

INVENTOR
David R. C. Devine
BY
Harding & Harding
ATTORNEYS.

UNITED STATES PATENT OFFICE.

DAVID R. C. DEVINE, OF PHILADELPHIA, PENNSYLVANIA, ASSIGNOR TO HIMSELF AND JOHN F. PHILLIPS, OF PHILADELPHIA, PENNSYLVANIA.

AUTOMOBILE-WHEEL.

No. 848,885. Specification of Letters Patent. Patented April 2, 1907.

Application filed July 20, 1906. Serial No. 326,968.

*To all whom it may concern:*

Be it known that I, DAVID R. C. DEVINE, a citizen of the United States, residing at Philadelphia, county of Philadelphia, and State of Pennsylvania, have invented a new and useful Improvement in Automobile-Wheels, of which the following is a full, clear, and exact description, reference being had to the accompanying drawings, which form a part of this specification.

My invention relates to vehicle-wheels, especially automobile-wheels.

The object of the invention is to enable pneumatic tires to be dispensed with and to that end to so construct the wheel that the rim is capable of being displaced against the pressure of a spring medium from its normal concentric position with relation to the hub, which spring medium constantly tends to restore the rim to such normal concentric position. While wheels provided with spring mechanism of this character are old and well known, they do not practically fulfil all the necessary requirements, failing particularly in durability in that the spring mechanism quickly breaks at or near its points of attachment, rendering the wheel useless or at least necessitating its frequent repair.

The object of my invention is, more specifically, to so construct the spring mechanism at its bearing-point or point of attachment that breakage thereof will be avoided; and my invention consists in the means adopted to that purpose, as well as in a special construction of wheel and spring mechanism embodying such means.

A wheel embodying my invention in its preferred form will now be described.

Figure 1:
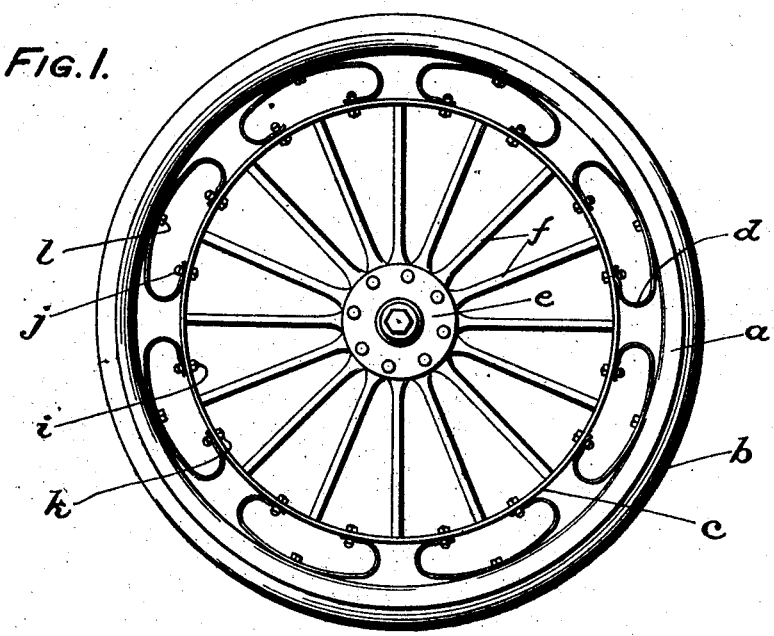
Figure 2:
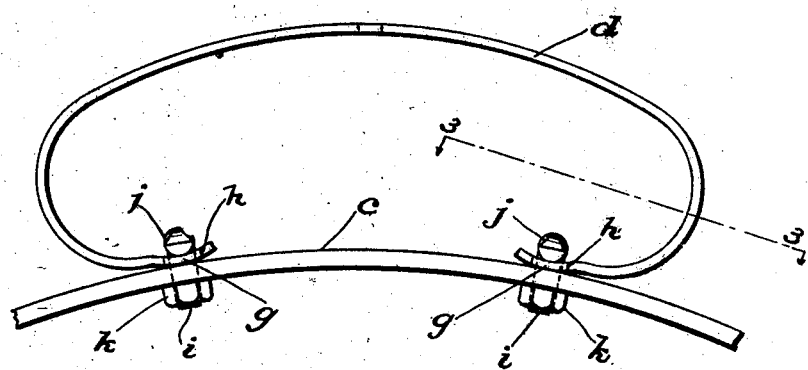
Figure 3:
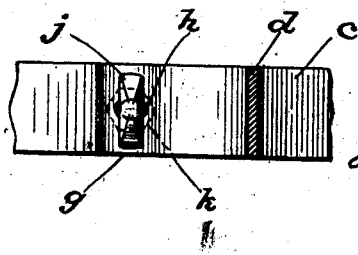

In the drawings, Figure 1 is a side elevation of a wheel embodying my invention. Fig. 2 is an enlarged detailed view of the spring and inner rim at their point of attachment, and Fig. 3 is a detailed sectional view on the line 3 3 of Fig. 2.

The wheel comprises generally an outer rim $a$, to which is secured the solid rubber or other tire $b$, the inner rim $c$, the elliptical springs $d$, connecting the outer and inner rims, the hub $e$, and the spokes $f$, uniting the hub and the inner rim.

Each spring, of which there is a series extending around the wheel, comprises a strip of spring metal bent approximately into the shape of an ellipse having the middle part of one of its long dimensions cut away. This strip is at its center secured to the outer rim in any convenient way, as by a bolt and nut $l$. Its ends are each bent outwardly and inwardly with respect to its intermediate portion and thence again bent successively toward and from the inner rim to form a bend or hump $g$, that contacts with the outer face of the inner rim. In that part of the spring bent as aforesaid is a slot $h$, extending longitudinally of the strip.

Extending through the inner rim and the slot $h$ is a bolt $i$, having a head $j$ overlying the concavity of the hump and a nut $k$. The under surface of the head of the bolt is convex, as shown, to correspond with the concavity of the hump, but with a more pronounced curvature.

When the wheel is in use, pressure is applied to the outer rim so as to compress a given spring $d$, and the ends thereof will rock upon their humps $g$, so as to tilt one extreme end of the spring outwardly away from the inner rim and the other extreme end of the spring inwardly toward the inner rim, and at the same time both ends of the spring will move slightly forwardly along the inner rim in the direction of the rotation of the wheel, this movement being permitted by the slots $h$. When one extreme end of the spring moves away from the inner rim, as aforesaid, the part of the spring adjacent to the hump contacts with the rim, thus distributing the strain upon the spring and preventing such strain from being localized at the point of connection with the inner rim. Upon the pressure being released the spring returns to its normal position. It is found that by permitting the ends of the spring to rock and slide upon the rim the strain on the spring, which otherwise would soon break it, is relieved by this rocking and sliding motion.

It is obvious that the means hereinbefore described for securing the springs to the rim may be applied to springs between the rim and hub that are shaped and located in a manner different from that hereinbefore described.

Having now fully described my invention, what I claim, and desire to protect by Letters Patent, is—

1. In a vehicle-wheel, the combination with a rim and a hub, of spring-strips confined between them and adapted to yield during compression of the rim, said springs being provided with a bend or hump adapted during the compression of the spring to rock and slide upon one of the wheel members.

2. In a vehicle-wheel, the combination with a rim and a hub, of spring-strips confined between them and adapted to yield during compression of the rim, said springs being provided with a bend or hump adapted during the compression of the spring to rock and slide upon one of the wheel members, said spring being slotted longitudinally in the part thereof provided with the hump, and a bolt engaging the slot and said wheel member.

3. In a vehicle-wheel, the combination with a rim and a hub, of spring-strips confined between them and adapted to yield during compression of the rim, said springs being provided with a bend or hump adapted during the compression of the spring to rock and slide upon one of the wheel members, said spring being slotted longitudinally in the part thereof provided with the hump, and a bolt engaging the slot and said wheel member, said bolt having a head whose under surface is convex and rests within the concavity of the hump.

4. In a vehicle-wheel, the combination with an outer rim, an inner rim spaced therefrom and normally concentric thereto, a hub, and connections between the hub and the inner rim, of a series of springs interposed between the rims, each spring comprising an elastic metal strip secured between its ends to the outer rim and having its ends bent inwardly toward each other, so as to lie outside the inner rim, each spring-strip, near each of its ends, being bent successively toward and from the inner rim to form a hump, contacting therewith, adapted during the compression of the spring to rock and slide upon the rim, said spring being slotted longitudinally near its end, and a bolt engaging the rim and the slot of the spring.

5. In a vehicle-wheel, the combination with an outer rim, an inner rim spaced therefrom and normally concentric thereto, a hub, and connections between the hub and the inner rim, of a series of springs interposed between the rims, each spring comprising an elastic metal strip secured between its ends to the outer rim and having its ends bent inwardly toward each other, so as to lie outside the inner rim, each spring-strip, near each of its ends being bent successively toward and from the inner rim to form a hump, contacting therewith, adapted during the compression of the spring to rock and slide upon the rim, and means securing the spring to the inner rim.

6. In a vehicle-wheel the combination with an outer rim, an inner rim spaced therefrom and normally concentric thereto, a hub, and connections between the hub and the inner rim, of a series of springs interposed between the rims, each spring comprising an elastic metal strip secured between the ends to the outer rim and having its ends bent inwardly toward each other, so as to lie outside the inner rim, each spring-strip, near each of its ends, being bent successively toward and from the inner rim to form a hump contacting therewith, said spring-strip being slotted longitudinally in that part of the strip so contacting with the inner rim, and a bolt extending through the rim and the slot of the spring-strip and having a head having a convex under surface overlying and contacting with the concavity of the hump.

7. In a vehicle-wheel, the combination with an outer rim, an inner rim spaced therefrom and normally concentric therewith, a hub and connections between the hub and the inner rim, of a series of springs interposed between the rims and secured to one of the rims, said springs each being bent outwardly and inwardly to form a hump contacting with the other rim and adapted in the compression of the spring to rock and slide upon its contacting rim.

8. In a vehicle-wheel, the combination with an outer rim, an inner rim spaced therefrom and normally concentric therewith, a hub, and connections between the hub and the inner rim, of a series of springs interposed between the rims and secured to one of the rims, said springs each being bent upwardly and inwardly to form a hump contacting with the other rim, said spring being slotted longitudinally in the part thereof provided with the hump, and a bolt engaging the slot and wheel member whose under surface rests within the concavity of the hump.

9. In a vehicle-wheel, the combination with an outer rim, an inner rim spaced therefrom and normally concentric thereto, a hub, and connections between the hub and the inner rim, of a series of springs interposed between the rims, each spring comprising an elastic strip secured between its ends to the outer rim and having its ends each bent successively outwardly and inwardly with respect to its intermediate portion and thence again bent for a relatively short distance outwardly and inwardly to form a hump contacting with the inner rim, said hump being slotted longitudinally, and a bolt engaging the rim and the slot of the spring.

In testimony of which invention I have hereunto set my hand, at Philadelphia, on this 14th day of July, 1906.

DAVID R. C. DEVINE.

Witnesses:
M. M. HAMILTON,
FRANK L. BUSSER.